(12) United States Patent
Johnson

(10) Patent No.: US 7,383,473 B2
(45) Date of Patent: Jun. 3, 2008

(54) SYSTEM AND METHOD FOR IDENTIFYING AND ISOLATING FAULTS IN A VIDEO ON DEMAND PROVISIONING SYSTEM

(75) Inventor: Keith Johnson, San Antonio, TX (US)

(73) Assignee: Time Warner Cable, Inc., Stamford, CT (US)

( * ) Notice: Subject to any disclaimer, the term of this patent is extended or adjusted under 35 U.S.C. 154(b) by 562 days.

(21) Appl. No.: 11/069,080

(22) Filed: Mar. 1, 2005

(65) Prior Publication Data

US 2006/0218600 A1    Sep. 28, 2006

(51) Int. Cl.
*G06F 11/00* (2006.01)
(52) U.S. Cl. ....................................................... 714/43
(58) Field of Classification Search .................... 714/43
See application file for complete search history.

(56) References Cited

U.S. PATENT DOCUMENTS

| 5,646,675 | A  | * | 7/1997  | Copriviza et al. ............. 725/22 |
| 5,819,019 | A  | * | 10/1998 | Nelson ............................ 714/4 |
| 5,874,992 | A  | * | 2/1999  | Caporizzo .................... 348/192 |
| 6,018,300 | A  | * | 1/2000  | Dowden et al. ............ 340/635 |
| 6,058,424 | A  | * | 5/2000  | Dixon et al. ................. 709/226 |
| 6,446,261 | B1 | * | 9/2002  | Rosser ........................ 725/34 |
| 6,598,229 | B2 | * | 7/2003  | Smyth et al. ................ 725/107 |
| 7,093,155 | B2 | * | 8/2006  | Aoki ............................. 714/4 |
| 7,120,819 | B1 | * | 10/2006 | Gurer et al. ................... 714/4 |
| 7,131,032 | B2 | * | 10/2006 | Gibson et al. ................ 714/26 |
| 7,254,622 | B2 | * | 8/2007  | Nomura et al. ............. 709/219 |
| 7,281,169 | B2 | * | 10/2007 | Golasky et al. .............. 714/43 |
| 2002/0087995 | A1 | * | 7/2002  | Pedlow, Jr. .................. 725/87 |
| 2002/0154892 | A1 | * | 10/2002 | Hoshen et al. ............... 386/87 |
| 2003/0070172 | A1 | * | 4/2003  | Matsuzaki et al. ........... 725/87 |
| 2004/0010588 | A1 | * | 1/2004  | Slater et al. ................ 709/224 |
| 2005/0278760 | A1 | * | 12/2005 | Dewar et al. ................ 725/94 |
| 2006/0218612 | A1 | * | 9/2006  | Johnson et al. ............. 725/107 |
| 2007/0050825 | A1 | * | 3/2007  | Bowen et al. ................ 725/86 |
| 2007/0050826 | A1 | * | 3/2007  | Bowen et al. ................ 725/87 |
| 2007/0050836 | A1 | * | 3/2007  | Stanek et al. .............. 725/131 |
| 2007/0127519 | A1 | * | 6/2007  | Hasek et al. ................ 370/466 |

* cited by examiner

*Primary Examiner*—Robert W. Beausoliel, Jr.
(74) *Attorney, Agent, or Firm*—Roberts Mardula & Wertheim, LLC

(57) ABSTRACT

A system and method for identifying and isolating faults in a video on demand (VOD) provisioning system. Transaction errors statistics are used to determine whether a fault has occurred in the VOD provisioning system. A high transaction error rate is associated with transaction error rates in components of the VOD provisioning system permitting identification of a likely cause of a high transaction error rate. Remedial action to repair the cause of the system fault is then directed to the likely cause of the high transaction error rate.

10 Claims, 4 Drawing Sheets

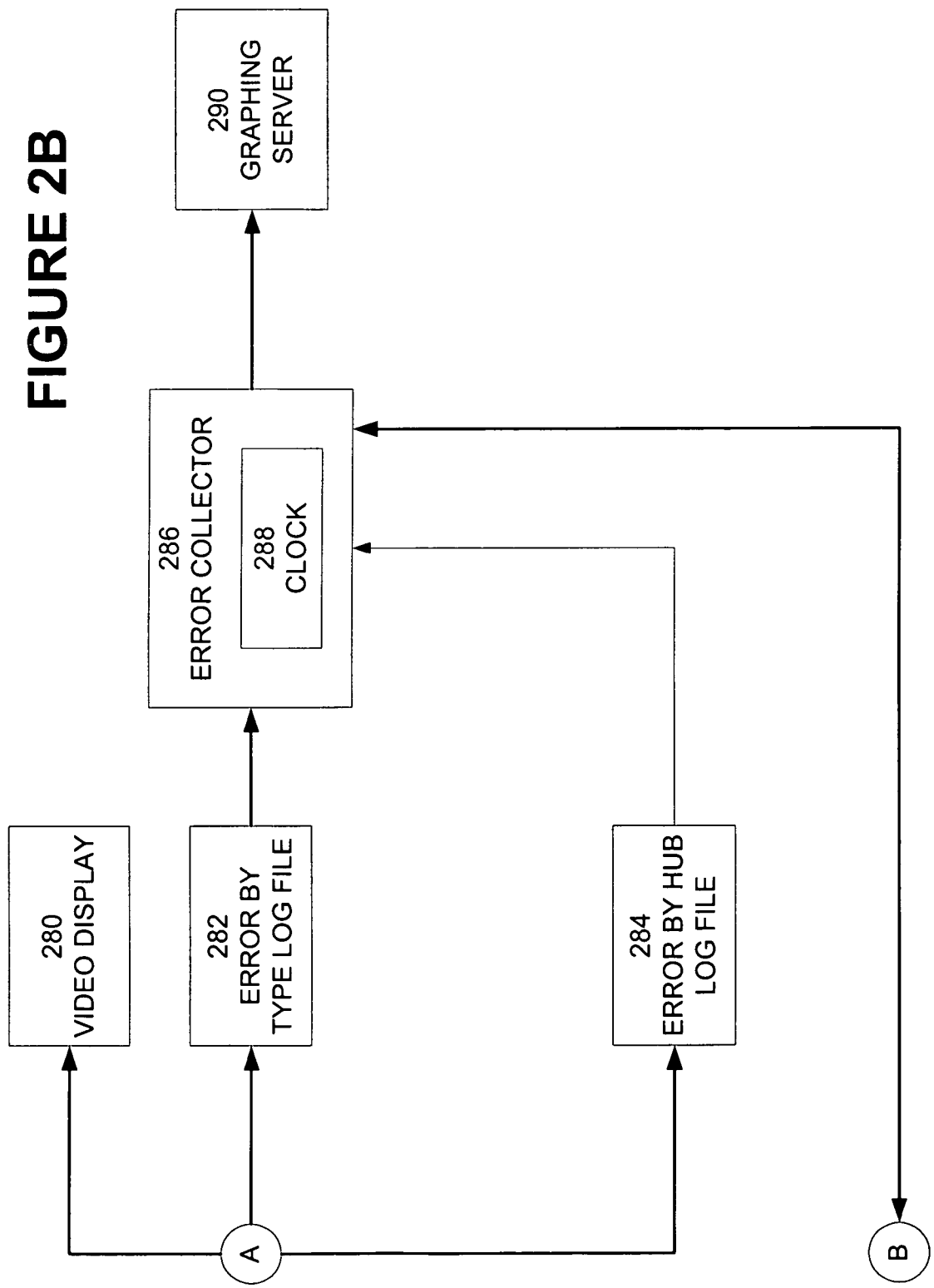

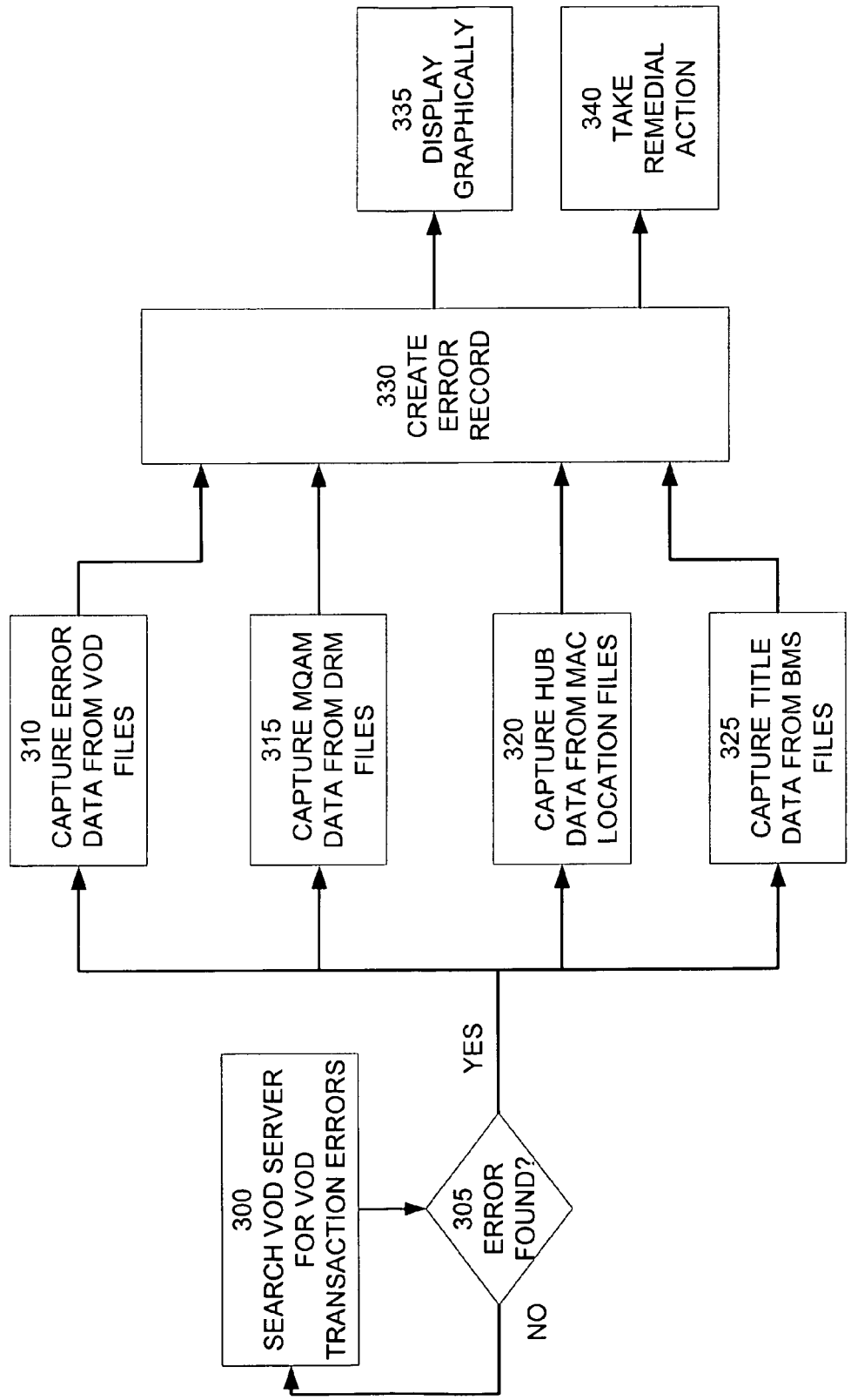

SYSTEM AND METHOD FOR IDENTIFYING AND ISOLATING FAULTS IN A VIDEO ON DEMAND PROVISIONING SYSTEM

BACKGROUND

Embodiments of the present invention are directed generally to cable network fault isolation and more specifically to the identification of faults in devices comprising a video on demand service in a hybrid fiber coax (HFC) cable network.

Cable networks deliver voice, data, and video to subscribers over a complex network of headends, regional data centers, hubs, and nodes. At the upstream terminus of the network is the headend and regional data center. Typically, a headend comprises the analog and digital video signal processors, video on demand systems, and other video content management devices. A regional data center comprises digital service management devices (e-mail servers, DNS, and Internet connectivity) and routers that interconnect the regional data center with a headend. A hub receives the video and data signals from the headend and regional data center, processes these signals through appropriate modulators, and sends these signals downstream to a hub. The hub provides the signals to a node that is ultimately associated with individual subscribers. A node provides an interface between the fiber-based component of the HFC cable network and the RF/cable component of the network that is the transport media to the home.

In a commercial network, a headend may service multiple hubs and a hub may service multiple nodes. A regional data center may provide digital services to multiple headends. From a node to the home, the RF/cable component of the HFC cable network may branch numerous times. Amplifiers, line extenders, and passive devices are employed to maintain signal quality across all branches (or "cascades") serviced by the node.

HFC cable networks are increasingly dependent on two-way data transport. Video on-demand or VOD services rely on out-of-band (OOB) channel signaling or a DOCSIS-compliant data channel to obtain requests for video content from a subscriber's set top box. In a typical configuration, the VOD service makes available to its users a selection of multiple video programs that they can choose from and watch over a network connection with minimum setup delay. At a high level, a VOD system consists of one or more VOD application servers that pass and/or store the relevant content; one or more network connections that are used for program selection and program delivery; and customer premises equipment (CPE) to receive, decode and present the video on a display unit.

The most common CPE for VOD is an addressable STB that provides the functions of receiving cable signals by tuning to the appropriate RF channel, processing the received signal and outputting VOD signals for viewing on a display unit. Such an STB also typically hosts a VOD application that enables user interaction for navigation and selection of a VOD menu.

FIG. 1 illustrates a video-on-demand provision system as known in the prior art. The various components of the network 100 include (i) one or more data and application origination points 102; (ii) one or more application distribution servers 104; (iii) one or more VOD application servers 105, and (iv) customer premises equipment (CPE) 106. The distribution server(s) 104, VOD application servers 105 and CPE(s) 106 are connected via HFC cable network 101.

The application origination point 102 comprises any medium that allows an application (such as a data download application or VOD-based application) to be transferred to a distribution server 104. This can include for example an application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill in the art.

The application distribution server 104 comprises a computer system where such applications can enter the network system. Distribution servers are well known in the networking arts, and accordingly are not described further herein.

The VOD application server 105 is a computer system where on-demand content can be received from one or more data sources 102 and enter the network system. These sources may generate the content/data locally, or alternatively act as a gateway or intermediary from a distant source. The VOD application server 105 includes the Session Resource Manager (SRM) functionality, and asks the network control system (NCS) for resources. The NCS responds with a negative or positive response to the request, and the VOD application server implements the appropriate resource allocation logic.

In U. S. cable systems, downstream RF channels used for transmission of television programs are 6 MHz wide, and occupy a 6 MHz spectral slot between 54 MHz and 860 MHz. Deployments of VOD services have to share this spectrum with already established analog and digital cable television services. For this reason, the exact RF channel used for VOD service may differ from plant to plant. However, within a given cable plant, all homes that are electrically connected to the same cable feed running through a neighborhood will receive the same downstream signal. For the purpose of managing VOD services, these homes are grouped into logical groups typically called service groups. Homes belonging to the same service group receive their VOD service on the same set of RF channels.

Several specific frameworks exist in the prior art for provisioning on-demand (e.g., VOD) and similar services to network subscribers. Notably, in the cable network context, the Interactive Services Architecture (ISA) specification (see, e.g., ISA Versions 1.4 and 1.5) published by the Time Warner Cable describes techniques and mechanisms for distributing and delivering movie titles for VOD services. The ISA specification defines functional roles and interfaces that enable the development of pluggable interactive services in a cable environment. The focus of the ISA is primarily on viewer services, which are defined as the set of functions provided by the cable operator to its customers.

Content (e.g., audio, video, etc.) is provided in each downstream (in-band) channel associated with the relevant service group. To communicate with the headend, the CPE 106 uses the OOB or DOCSIS channels and associated protocols.

The provision of VOD services may fail as a result of faults in any of the components and communication paths described above. What would be useful is a system and method for determining that a fault affecting multiple subscribers has occurred and for identifying the probable cause and location of that fault.

SUMMARY

Cable networks have evolved from downstream broadcast systems provided over coax cable to hybrid fiber cable (HFC) networks capable of both downstream and upstream communications using both analog and digital signals. With respect to video services, modern set top boxes send upstream signals to the headend to request video on demand (VOD) services and to issue control commands (play, stop, fast forward, rewind, and pause) that affect the video stream. Two-way STBs are addressable, can be associated with a subscriber, and can be associated with a physical location with an HFC cable network. As will be appreciated by those skilled in the art, an STB may be either a standalone device or incorporated into a cable-ready television. Additionally, a STB may be adapted such that the security and access functions are performed by an external PCMCIA-type card. See, OpenCable™ Multistream CableCARD Interface Specification OC-SP-MC-IF-I02-040831.

In an embodiment of the present invention, a video on demand (VOD) analysis system interacts with various components of a VOD provisioning system (VOD-PS). The VOD-PS comprises a network control system (NCS), a business-management support (BMS) system that establishes a link between VOD application servers and the cable transport plant, set-top boxes and billing system, and a VOD application server.

In an exemplary embodiment of the present invention, the VOD-PS conforms to the Interactive Services Architecture (ISA) standard developed by the assignee of this application. ISA describes techniques and mechanisms for distributing and delivering movie titles for VOD services. The ISA specification defines functional roles and interfaces that enable the development of pluggable interactive services in a cable environment. The focus of the ISA is primarily on viewer services, which are defined as the set of functions provided by the cable operator to its customers.

When a subscriber orders a movie, that request is processed from the set-top through the transport network to the network controller system, then onto a VOD application server. The VOD application server transmits the content through an asynchronous serial interface or Gigabit Ethernet port to QAM modulators at the hub and into the subscriber's home. The BMS system keeps track of the negotiations, keeps records, and interfaces with the billing systems.

The VOD application server comprises logs reflecting transactions between an STB and the VOD-PS. The logs are searched for string values that reflect that an error in VOD transactions. Log entries that reflect VOD transaction errors are parsed to determine the time of the VOD transaction error, the MAC address of the STB that experienced the error, the service type, and error type. The STB MAC address permits identification of the physical location of the STB, the hub components assigned to provide services to that STB, and the cable/RF resources that establish the communication that is used to convey the content to the subscriber. VOD transaction errors are then converted to text strings that may be displayed graphically so as to permit identification of systemic faults in the components of the VOD-PS and to facilitate the isolation of the source of the fault.

It is therefore an aspect of the present invention to monitor VOD-PS transactions to determine when VOD transaction errors occur.

It is another aspect of the present invention to present the VOD transaction errors graphically to facilitate isolation of the source of the VOD transaction error.

It is yet another aspect of the present invention to speed the correction of systemic faults in the VOD-PS so as to maintain service to subscribers.

It is still another embodiment of the present invention to off-load the error detection and isolation function from the resources that support the VOD-PS.

These and other aspects of the present invention will be apparent from a review of the general and specific descriptions that follow.

An embodiment of the present invention provides a method for identifying faults in a VOD provisioning system. VOD transaction errors are received over a sampling period. The VOD transaction error is associated with an error type. The error type is associated with a failure of a component of the VOD provisioning system. A VOD transaction error rate for the error type is determined over the time period (herein, $VTE_{P(type)}$) and compared to a VOD transaction error threshold for the error type associated with the sampling period (herein, $T_{ER(type)}$). If $VTE_{P(type)} > T_{ER(type)}$, then remedial action is taken to repair the component associated with the error type.

Another embodiment of the present invention provides a method for identifying faults in a VOD provisioning system. A sampling interval (herein, SI) is established. A VOD transaction error is associated with an error type. The error type is associated with a failure of a component of the VOD provisioning system. A VOD transaction error rate of the error type over the first time segment (herein, $VTE_{T1(type)}$) is determined and compared to a first VOD error rate threshold for the error type associated with a first time segment (herein, $T_1$), wherein $T_1 = (A) \times (SI)$ and A is an integer. A VOD transaction error rate of the error type over the second time segment (herein, $VTE_{T2(type)}$) is determined and compared to a second VOD error rate threshold for the error type associated with a second time segment (herein, $T_2$) wherein $T_2 = (B) \times (SI)$, B is an integer, and $B > A$. If $VTE_{T1(type)} > T_1$, then remedial action is taken to repair the component associated with the error type. If $VTE_{T2(type)} > T_2$, then taking remedial action is taken to repair the component associated with the error type.

Yet another embodiment of the present invention provides a method for identifying faults in a VOD provisioning system. A VOD transaction error sampling period is established. VOD transaction errors are received over the sampling period. A VOD transaction error rate over the sampling period (herein, $VTE_P$) is determined and compared to a VOD error rate threshold associated with the sampling period (herein, $T_{ER}$). If $VTE_P$ exceeds $T_{ER}$, an alert that a fault has occurred in the VOD provisioning system is issued. The likely cause of the fault is isolated and remedial action to eliminate the cause of the fault is taken.

In an embodiment of the present invention, in order to isolate the likely cause of the fault and take remedial action to eliminate the cause of the fault a VOD transaction error is associated with a hub of the VOD provisioning system. A hub VOD transaction error rate over the sampling period (herein, $VTE_H$) is determined and compared to a hub VOD transaction error rate threshold associated with the sampling period (herein, $T_H$). If $VTE_H > T_H$, then remedial action is taken to repair the hub.

In order to associate the VOD transaction error with the hub, a VOD transaction error record is parsed for STB identifying information of an STB experiencing the VOD transaction error. The VOD provisioning system is searched for a customer record comprising the STB identifying information. The customer record is parsed for hub identifying information associated with the STB identifying information. In an embodiment of the present invention, the STB identifying information is selected from the group consisting of an IP address, a MAC address, and a serial number.

In an embodiment of the present invention, in order to take remedial action to repair the hub a VOD transaction error is associated with a modulator of the hub. A modulator VOD transaction error rate over the sampling period (herein, $VTE_M$) is determined and compared to a modulator VOD transaction error rate threshold associated with the sampling period (herein, $T_M$). If $VTE_M > T_M$, then remedial action to repair the modulator is taken.

In order to associate the VOD transaction error with the modulator, a VOD transaction error record is parsed for STB identifying information of an STB experiencing the VOD transaction error. The VOD provisioning system is searched for a customer record comprising the STB identifying information. The customer record is parsed for the modulator identifying information associated with the STB identifying information. The modulator identifying information is associated with the hub. In an embodiment of the present invention, the STB identifying information is selected from the group consisting of an IP address, a MAC address, and a serial number.

In another embodiment of the present invention, in order to take remedial action to repair the hub a VOD transaction error is associated with a demodulator of the hub. A demodulator VOD transaction error rate over the sampling period (herein, $VTE_D$) is determined and compared to a demodulator VOD transaction error rate threshold associated with the sampling period (herein, $T_D$). If $VTE_D > T_D$, then remedial action to repair the demodulator is taken.

In order to associate the VOD transaction error with the demodulator, a VOD transaction error record is parsed for STB identifying information of an STB experiencing the VOD transaction error. The VOD provisioning system is searched for a customer record comprising the STB identifying information. The customer record is parsed for the demodulator identifying information associated with the STB identifying information. The demodulator identifying information is associated with the hub. In an embodiment of the present invention, the STB identifying information is selected from the group consisting of an IP address, a MAC address, and a serial number.

An embodiment of the present invention provides a method for identifying faults in a VOD provisioning system. A VOD transaction error sampling period is established. VOD transaction errors are received over the sampling period. A VOD transaction error rate over the sampling period (herein, $VTE_P$) is determined and compared to a VOD error rate threshold associated with the sampling period (herein, $T_{ER}$). If $VTE_P$ exceeds $T_{ER}$, the VOD transaction error is associated with a video asset, wherein the video asset is located on a video asset server of the VOD provisioning system. An asset VOD transaction error rate over the sampling period (herein, $VTE_A$) is determined and compared to an asset VOD transaction error rate threshold associated with the sampling period (herein, $T_A$). If $VTE_A > T_A$, then remedial action is taken to repair the video asset server.

In an embodiment of the present invention, a system for isolating faults in a video on demand (VOD) comprises a VOD log processor and a video error compiler. The VOD log processor compiles VOD transaction error data. The video error compiler receives the VOD transaction error data from the VOD log processor, determines a VOD transaction error rate over a sampling period (herein, $VTE_P$), and compares $VTE_P$ to a VOD error rate threshold associated with the sampling period (herein, $T_{ER}$). If $VTE_P$ exceeds $T_{ER}$, the video error compiler issues an alert that a fault has occurred in the VOD provisioning system, isolates a likely cause of the fault and issues an instruction to take remedial action to repair the cause of the fault.

In an embodiment of the present invention, the system further comprises means for acquiring STB identifying information of a set top box that experienced the VOD transaction error. In this embodiment, the video error compiler associates the VOD transaction error with a hub of the VOD provisioning system using the STB identifying information, determines a hub VOD transaction error rate over the sampling period (herein, $VTE_H$), and compares $VTE_H$ to a hub VOD transaction error rate threshold associated with the sampling period (herein, $T_H$). If $VTE_H > T_H$, then the video error compiler issues an instruction to take remedial action to repair the hub.

In yet another embodiment of the present invention, if $VTE_H > T_H$, the video error compiler associates a VOD transaction error with a modulator of the hub of the VOD provisioning system using the STB identifying information, determines a modulator VOD transaction error rate over the time period (herein, $VTE_M$), and compares $VTE_M$ to a modulator VOD transaction error rate threshold associated with the sampling period (herein, $T_M$). If $VTE_M > T_M$, the video error compiler issues an instruction to take remedial action to repair the modulator.

In still another embodiment of the present invention, if $VTE_H > T_H$, the video error compiler associates a VOD transaction error with a demodulator of the hub of the VOD provisioning system using the STB identifying information and determines a demodulator VOD transaction error rate over the sampling period (herein, $VTE_D$). The video error compiler compares $VTE_D$ to a demodulator VOD transaction error rate threshold (herein, $T_D$). If $VTE_D > T_D$, the video error compiler issues an instruction to take remedial action to repair the demodulator.

In an embodiment of the present invention, a system for isolating faults in a video on demand (VOD) provisioning system comprises a VOD log processor and a video error compiler. The VOD log processor compiles VOD transaction error data. The video error compiler receives the VOD transaction error data from the VOD log processor and determines a VOD transaction error rate over a sampling period (herein, $VTE_P$). The video error compiler compares $VTE_P$ to a VOD error rate threshold associated with the sampling period (herein, $T_{ER}$). If $VTE_P$ exceeds $T_{ER}$, the video error compiler associates a VOD transaction error with a video asset located on a video asset server of the VOD provisioning system. An asset VOD transaction error rate over the time period (herein, $VTE_A$) is determined and compared to an asset VOD transaction error rate threshold associated with the sampling period (herein, $T_A$). If $VTE_A > T_A$, then an instruction is issued to take remedial action to repair the video asset server.

DESCRIPTION OF THE DRAWINGS

FIGS. 2A and 2B illustrate a video on demand analysis system (VOD-AS) according to an embodiment of the present invention.

FIG. 3 illustrates a flow diagram of a process by which a video on demand analysis system (VOD-AS) acquires and processes VOD transaction error data according to an embodiment of the present invention.

DETAILED DESCRIPTION

Figure 1:
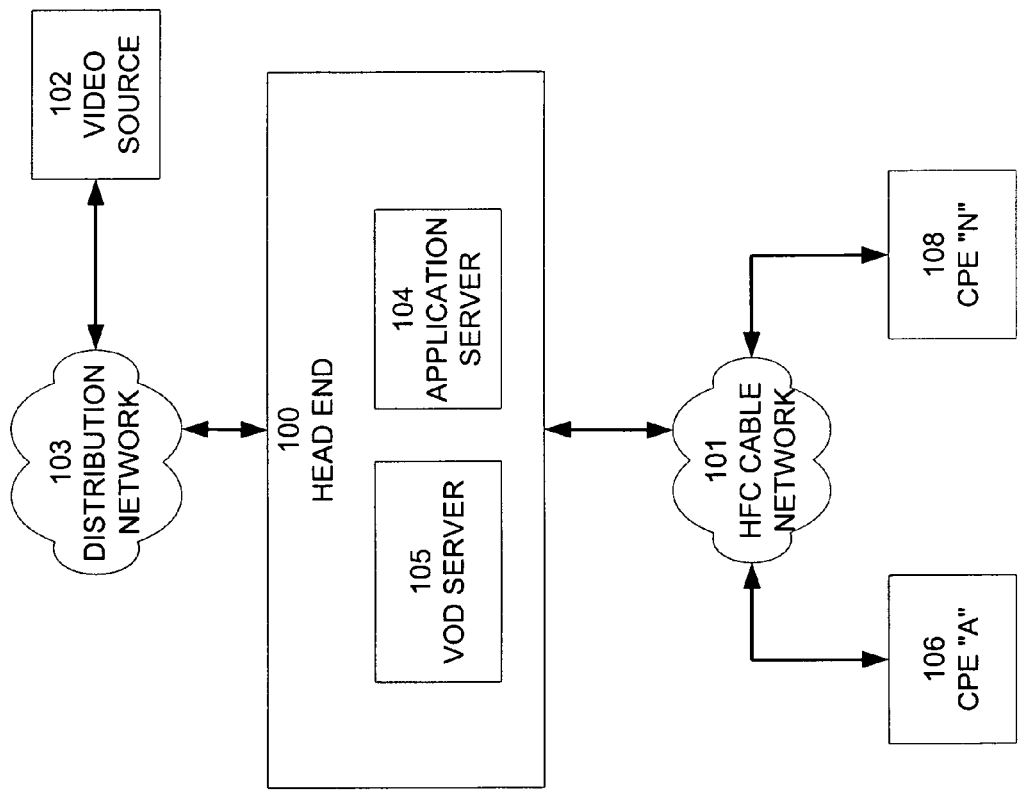
FIG. 1 illustrates a video-on-demand provision system as known in the prior art.

The following terms are used in the description that follows. The definitions are provided for clarity of understanding:

> Cascade—A serial path extending from an active device.
> CM—Cable modem.
> CPE—Customer premises equipment.
> grep—Acronym for Global-Regular-Expression-Print, grep is a utility that searches through files for specific patterns, including regular expressions and strings.
> HFC—Hybrid Fiber Coax. A network design that employs both fiber optic and coaxial cables to deliver cable video and data services.
> Hub—The local source of cable services. By way of illustration and not as a limitation, a hub may serve 20,000 subscribers.
> ISA—Interactive Services Architecture.
> Node—A device that provides an interface between the fiber optic and coaxial cable systems of an HFC cable system. Light from a fiber optic cable is converted into an electrical signal suitable for delivery in a coaxial cable system within this device.
> STB—Set top box.
> VOD—Video on demand. VOD is the generic term for a collection of services such as HBO on demand (HOD), movies on demand (MOD), SVOD (subscription video on demand), FOD (free on demand), and other similar services.

In an embodiment of the present invention, a video on demand (VOD) analysis system interacts with various components of a VOD provisioning system (VOD-PS). The VOD-PS comprises a network control system (NCS), a business-management support (BMS) system that establishes a link between VOD application servers and the cable transport plant, set-top boxes and billing system, and a VOD application server.

In an exemplary embodiment of the present invention, the VOD-PS conforms to the Interactive Services Architecture (ISA) standard developed by the assignee of this application. ISA describes techniques and mechanisms for distributing and delivering movie titles for VOD services. The ISA specification defines functional roles and interfaces that enable the development of pluggable interactive services in a cable environment. The focus of the ISA is primarily on viewer services, which are defined as the set of functions provided by the cable operator to its customers.

When a subscriber orders a movie, that request is processed from the set-top through the transport network to the network controller system, then onto a VOD application server. The VOD application server provisions STBs to receive VOD services from the cable network operator. By way of illustration and not as a limitation, a VOD application server downloads the VOD client process to STBs, sends available program listings to STBs, and determines what assets are available to an STB under what genres. The BMS system keeps track of the negotiations, keeps records, and interfaces with the billing systems. A VOD content server actually transmits the content through an asynchronous serial interface or Gigabit Ethernet port to QAM modulators at the hub and into the subscriber's home.

The VOD application server comprises logs reflecting transactions between an STB and the VOD-PS. The logs are searched for string values that reflect that an error in VOD transactions. By way of illustration and not as a limitation, a VOD transaction error will be logged when a problem occurs in the communication path between the STB and VOD application server, when the session between the VOD application server and STB is interrupted, when the STB attempts to find a program at a specified location but the program is not at the specified location, and when the transaction times out. VOD transaction errors are typically identified by an error code that identifies the type of error that was experienced.

Log entries that reflect VOD transaction errors are parsed to determine the time of the VOD transaction error, the MAC address of the STB that experienced the error, the service type, and error type. The STB MAC address permits identification of the physical location of the STB, the hub components assigned to provide services to that STB, and the cable/RF resources that establish the communication that is used to convey the content to the subscriber. VOD transaction errors are then converted to text strings that may be displayed graphically so as to permit identification of systemic faults in the components of the VOD-PS and to facilitate the isolation of the source of the fault.

Figure 2A:
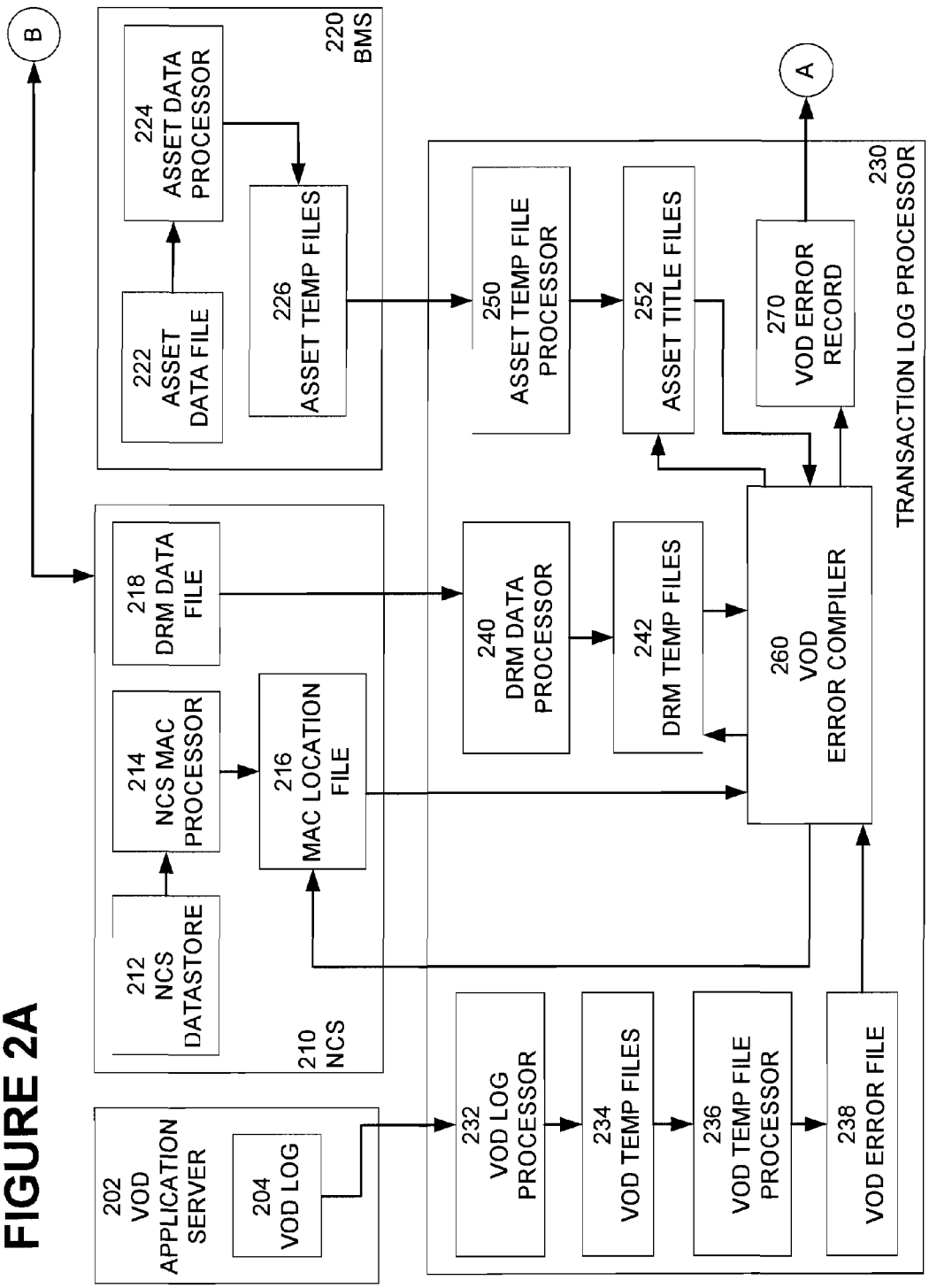

FIGS. 2A and 2B illustrate a video on demand analysis system (VOD-AS) according to an embodiment of the present invention. Referring to FIG. 2A, a transaction log processor 230 accesses data logs on VOD application server 202, network control system (NCS) 210, and business-management support (BMS) system 220. The data logs on VOD application server 202 reflect VOD transaction errors that occur during setup. The logged data comprises the MAC address of the STB that experienced the error. Because these logs can be quite large, subsets of these logs are captured and stored in temporary files. This reduces storage resources and also provides for faster searches.

NCS 210 comprises data resource management (DRM) logs. These logs comprise information relating to the MQAM that experienced a VOD transaction error. If the same MQAM is implicated in numerous errors it can narrow the troubleshooting process. Because these logs can be quite large, subsets of these logs are captured and stored in temporary files. This reduces storage resources and also provides for faster searches.

The BMS system 220 comprises ISA logs. These logs comprise data related to communications among the various VOD components and systems. Because these logs can be quite large, subsets of these logs are captured and stored in temporary files. This reduces storage resources and also provides for faster searches.

VOD log processor 232 residing on transaction log processor 230 accesses VOD log 204 residing on VOD application server 202. In this embodiment, the VOD log processor 232 checks the date stamp of VOD logs and determines which record has the latest date code and then opens that record for reading. The record is formatted to facilitate analysis and the reformatted data stored in VOD temp files 234. By way of illustration and not as a limitation, in an exemplary embodiment of the present invention, analysis of the VOD records is performed using a "grep" tool. "Grep" is a utility that searches through files for specific patterns, including regular expressions and strings. Because VOD records typically span several lines for a single record, the VOD records in their native form are difficult to grep. The VOD log processor 232 strips newline characters and replaces then with pipe characters as separators. Thus, a multi-line VOD log record becomes a single-line record that is simpler to grep.

In an embodiment of the present invention, VOD temp files 234 comprises a fixed number of records. The data in the temporary files are overwritten as new data is captured.

By way of illustration and not as a limitation, in an exemplary embodiment of the present invention, VOD temp files 234 comprises three records each comprising approximately ten minutes of VOD log data, meaning that the last 20 to 30 minutes of VOD data are available for analysis at any time.

The records within VOD temp files 234 are analyzed for errors by VOD temp file processor 236. VOD temp file processor checks to see which of the records within VOD temp files 234 has the most recent date stamp and opens that record for reading and searches the record for strings that are indicative of VOD transaction errors. In an exemplary embodiment of the present invention, the search string is "PUT_SETTOP_ERROR." The presence of this string indicates that an error occurred when a VOD stream setup was attempted. When this string is detected within the record, VOD temp file processor 236 parses the record for time, STB MAC address, service type (HOD, MOD, etc.), and error type. These data are stored in VOD error file 238 and sent to VOD error compiler 260. The data are also stored in VOD error record 270.

Transaction log processor 230 then begins querying other logs for additional information relating to the error or the STB that experienced the error.

Before transaction log processor 230 can issue queries about errors to other logs, these other logs require processing. Data resource management (DRM) data processor 240 residing on transaction log processor 230 checks the date stamp of DRM records on the NCS and collects a subset of the DRM log data. It sends its output to DRM temp files 242 residing on transaction log processor 230. In an embodiment of the present invention, DRM temp files 242 comprise a fixed number of records. The data in the temporary files are overwritten as new data is captured. By way of illustration and not as a limitation, in an exemplary embodiment of the present invention, DRM temp files 242 comprises three records each comprising approximately ten minutes of DRM log data, meaning that the last 20 to 30 minutes of DRM data are available for analysis at any time.

VOD error compiler 260 receives VOD error file 238. When a VOD transaction error occurs, VOD error compiler 260 analyzes the records held in DRM temp files 242 for STB MAC address errors that occurred within a fixed time of the VOD transaction error. In an exemplary embodiment of the present invention, DRM temp file processor captures STB MAC address errors from DRM temp files 242 that occurred within +/−5 seconds of the VOD error time. The records in DRM temp files 242 are further analyzed for the MQAM modulator associated with the STB experiencing the MAC address error.

NCS MAC processor 214 resides in the NCS 210. NCS MAC processor queries the NCS datastore 212 to obtain the QPSK modulator ID and QPSK demodulator ID associated with an STB MAC address. This information is saved in MAC location file 216 that resides on NCS 210.

When VOD error compiler 260 detects a VOD transaction error, the VOD error compiler 260 searches MAC location file 216 to obtain the QPSK modulator identifier(s) and QPSK demodulator identifier(s) associated with the STB that experience the MAC address error. It converts the QPSK modulator ID to a hub site name and appends the QPSK demodulator identifier. VOD error compiler then adds these data to the VOD error record 270.

Asset data file 222 resides in BMS system 220 and comprises data related to communications among the various VOD components and systems and the titles of programs that are served by the VOD application server 202. Asset data processor 224 creates a subset of these data and saves it to asset temp files 226 residing on BMS system 220. In an embodiment of the present invention, asset temp files 226 comprise a fixed number of records. The data in the temporary files are overwritten as new data is captured By way of illustration and not as a limitation, in an exemplary embodiment of the present invention, asset temp files 226 comprises three records each comprising approximately ten minutes of asset log data, meaning that the last 20 to 30 minutes of asset data are available for analysis at any time.

Asset temp file processor 250 formats and searches records held in asset temp files 226 for information relating to the titles of programs that requested by subscribers during the period represented by the subset of data held in asset temp files 226. The program title data is stored in asset title files 252.

In an embodiment of the present invention, when a VOD transaction error occurs, VOD error compiler 260 queries the records held in asset temp files 252 for titles requested within a fixed period of time of the occurrence of the VOD transaction error. In an exemplary embodiment of the present invention, VOD error compiler 260 capture titles requested within +/−35 seconds of the VOD transaction error.

VOD error compiler 260 adds the title information to the VOD error record 270. When all of the log data has been analyzed, VOD error record comprises an error time, a MAC address of a STB that experienced the VOD transaction error (sometimes referred to herein as the "error MAC"), an error type, an error service, a QAM modulator ID of the modulator assigned to the STB that experienced the VOD transaction error (sometimes referred to herein as the "error QAM modulator ID"), a hub/demodulator ID assigned to the STB that experienced the VOD transaction error (sometimes referred to herein as the "error hub/demodulator ID"), and the title of the program requested by the STB when the VOD transaction error occurred.

Referring now to FIG. 2B, the information held in VOD error record 270 is parsed and sent to a video display 280, an error by type file 282, and an error by hub log file 284.

Error collector 286 comprises clock 288. Error collector 286 creates reports of errors over specified increments of time. The increments are managed by clock 288. The reports are sent to NCS 210 and to video display 280.

In an exemplary embodiment of the present invention, every ten minutes, error collector 286 counts the number of VOD transaction errors reported and subtracts the previous count to arrive at the number of errors in the past 10 minute interval. Error collector 286 then creates a text string in the format "YYYYMMDD-hhmm ALG, type-count, type-count, . . . , type-count, EOM" and sends to this to graphing server 290. In this exemplary embodiment, the string is sent at 0 minutes after the hour and every 10 minutes thereafter.

In another exemplary embodiment of the present invention, every ten minutes the error collector 286 counts the total number of errors by type since midnight, selects the top eight error generators by type and builds a text string of the format "YYYYMMDD-hhmm TEC, type-count, type-count, . . . , type-count, EOM". This is sent to the graphing server 290 at 1 minute after the hour and every 10 minutes thereafter.

In yet another exemplary embodiment of the present invention, every ten minutes the error collector 286 queries the NCS for the latest session setup statistics. Once the latest stats are read in they are analyzed and built into a text string of format "YYYYMMDD-hhmm BMS, requests-count, successes-count, teardowns-count, EOM". This string is sent to the graphing server at 3 minutes after the hour and every 10 minutes thereafter.

In still another exemplary embodiment of the present invention, every ten minutes the error collector counts the total number of errors by hub since midnight and builds a text string of the format "YYYYMMDD-hhmm EBH, hub-count, hub-count, . . . , hub-count, EOM". This is string sent to the graphing server at 2 minutes after the hour and every 10 minutes thereafter.

In another exemplary embodiment of the present invention, error collector 286 moves copies of all error logs to the NCS 210 every 10 minutes to provide operators with local copies of VOD errors so as to facilitate troubleshooting the VOD-PS.

FIG. 3 illustrates a flow diagram of a process by which a video on demand analysis system (VOD-AS) acquires and processes VOD transaction error data according to an embodiment of the present invention. Logs on the VOD application server are searched for VOD transaction errors 300. In an embodiment of the present invention, a subset of the VOD application server logs is created and stored in temporary files comprising a fixed number of records. The data in the temporary files are written over as new data is captured.

In an exemplary embodiment of the present invention, the VOD application server logs are searched using the search string, "PUT_SETTOP_ERROR". The presence of this string indicates that an error occurred when a VOD stream setup was attempted. If a VOD transaction error is not found, the process continues restarts 300.

If a VOD transaction error is found 305, the record is parsed for time, STB MAC address, service type (HOD, MOD, etc.), and error type 310. These data are used to create a VOD error record 330. Additionally, MQAM data is captured from DRM files 315 (see FIG. 1, 218), hub data is captured from STB MAC location files 320 (see FIG. 1, 216), and title data is captured from asset data files 325 (see FIG. 1, 222). These data are also incorporated into the VOD error record 330. The completed error record is displayed graphically 335.

In an embodiment of the present invention, the DRM files, the STB MAC location files, and the asset data files are first sorted to obtain a subset of the data held in each file. The data subsets are stored in temporary files comprising a fixed number of records. The data in the temporary files are overwritten as new data is captured that are stored for a fixed time. By way of illustration and not as a limitation, in an exemplary embodiment of the present invention, temp files comprise three records that are held for ten minutes, meaning that the last 20 to 30 minutes of data are available for analysis at any time. Additionally, the asset temp files are further sorted to capture title information only that is saved in an asset title file, again reducing the time for searching and obtaining VOD transaction error data (see FIG. 1, 252).

In another embodiment of the present invention, the data in the DRM files and the asset data files are searched within a fixed time of the occurrence of a VOD transaction error. By way of illustration and not as a limitation, in response to the detection of a VOD transaction error, DRM temp files are polled for the STB MAC address errors and pass through errors that occurred within +/−5 seconds of the VOD transaction error time. The MQAM modulator ID information is then obtained. The asset title files are polled for titles requested within +/−35 seconds of the VOD transaction error.

The data are displayed graphically 335. In an exemplary embodiment of the present invention, transaction error counts by type over ten-minute intervals are displayed. In another exemplary embodiment of the present invention, every ten minutes a count of the total number of errors by type since midnight is displayed. In yet another embodiment of the present invention, the only the top eight error generators by type are displayed.

In yet another exemplary embodiment of the present invention, every ten minutes the latest session setup statistics are displayed. This display comprises a VOD request count, a VOD success count, and a teardown count.

In still another exemplary embodiment of the present invention, every ten minutes the error collector displays the total number of errors by hub since midnight.

Remedial action is taken 340. Data collected by the VOD-AS may be used to identify and/or isolate fault conditions within the VOD system. By way of illustration and not as a limitation, when graphs of errors as a function of time indicate that errors exceed a threshold level, the error data is processed to ascertain if the errors are global in scope or isolated to a specific service group, hub, or group of hubs. By way of illustration, a high hub error rate may indicate that a modulator or demodulator requires remedial action. Review of the error rates associated with these devices may be used to isolate the failure.

In another embodiment of the present invention, error types are mapped to particular network components or systems. In this embodiment, error rates are determined for each error type. If an error rate for an error type exceeds an error rate threshold, the systems and devices mapped to that error type are evaluated and repaired.

In yet another embodiment of the present invention, error rates are determined by video asset. If a particular video asset is associated with an error rate that exceeds an error rate threshold, the video asset server is evaluated and repaired.

As will be appreciated by those skilled in the art, "repair" of a network component or system comprises a wide range of remedial actions. By way of illustration and not as a limitation, a network or component or system may be "repaired" by replacing the component or system, rebooting, reprogramming, upgrading, and reconfiguring.

A system and method for identifying and isolating faults in a video on demand provisioning system have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular. Moreover, a reference to a specific time, time interval, and instantiation of scripts or code segments is in all respects illustrative and not limiting.

What is claimed is:

1. A method for identifying faults in a network path used to provide video on demand (VOD) provisioning comprising:

accessing a transaction log comprising information of VOD transactions between set-top boxes (STBs) and a VOD provisioning system, wherein the VOD transactions comprise request for content from the STBs and responses to the requests by the VOD provisioning system, and wherein the VOD transaction information comprises transaction error entries for requests from STBs that are not fulfilled;

parsing the log for transaction error entries;

parsing a transaction error entry for identifying information of an STB for which a request was not fulfilled;

querying a first datastore for hub identifying information associated with the STB identifying information; and defining a network path connecting the STB to the hub and connecting the hub to the VOD provisioning system, wherein the network path is identified as experiencing a fault.

2. The method of claim 1, wherein STB identifying information is selected from the group consisting of an IP address, a MAC address, and a serial number.

3. The method of claim 1, wherein querying a first datastore for hub identifying information associated with the STB identifying information comprises:

querying the first datastore to obtain a QPSK modulator identifier associated with the STB identifying information; and identifying a hub location from the QPSK modulator identifier.

4. The method of claim 1, wherein defining a network path connecting the STB to the hub and connecting the hub to the VOD provisioning system, wherein the network path is identified as experiencing a fault comprises:

querying a second datastore to obtain a location of the STB; and defining a network path connecting the STB location to the hub location and connecting the hub location to the VOD provisioning system, wherein the network path is identified as experiencing a fault.

5. The method of claim 1, wherein the hub identifying information associated with the STB identifying information comprises a QPSK modulator identifier, a QPSK demodulator identifier, a QAM identifier, and a service group identifier.

6. The method of claim 5 further comprising:
establishing a transaction error sampling period;
for each transaction log entry during the sampling period, creating a record comprising:
a MAC address of the STB for which a request is not fulfilled; and
determining a number of transaction log entries comprising the MAC address;
if the number of transaction log entries comprising the MAC address exceeds a MAC address threshold value, then taking remedial action directed to the STB.

7. The method of claim 5 further comprising:
establishing a transaction error sampling period;
for each transaction log entry during the sampling period, creating a record comprising:
QPSK modulator identifier associated with the MAC address of the STB for which a request is not fulfilled; and
determining a number of transaction log entries comprising the QPSK modulator identifier;
if the number of transaction log entries comprising the QPSK modulator identifier exceeds a QPSK modulator threshold value, then taking remedial action directed to the QPSK modulator.

8. The method of claim 5 further comprising:
establishing a transaction error sampling period;
for each transaction log entry during the sampling period, creating a record comprising:
a QPSK demodulator identifier associated with the MAC address of the STB for which a request is not fulfilled;
determining a number of transaction log entries comprising the QPSK demodulator identifier;
if the number of transaction log entries comprising the QPSK demodulator identifier exceeds a QPSK demodulator threshold value, then taking remedial action directed to the QPSK demodulator.

9. The method of claim 5 further comprising:
establishing a transaction error sampling period;
for each transaction log entry during the sampling period, creating a record comprising:
a QAM identifier associated with the MAC address of the STB for which a request is not fulfilled;
determining a number of transaction log entries comprising the QAM identifier;
if the number of transaction log entries comprising the QAM identifier exceeds a QAM threshold value, then taking remedial action directed to the QAM.

10. The method of claim 5 further comprising:
establishing a transaction error sampling period;
for each transaction log entry during the sampling period, creating a record comprising:
a service group identifier associated with the MAC address of the STB for which a request is not fulfilled;
determining a number of transaction log entries comprising the service group identifier;
if the number of transaction log entries comprising the service group identifier exceeds a service group threshold value, then taking remedial action directed to the service group.

* * * * *